(12) United States Patent
Zhou et al.

(10) Patent No.: US 12,072,296 B2
(45) Date of Patent: Aug. 27, 2024

(54) PORTABLE VISUAL INSPECTION APPARATUS AND METHOD FOR INSPECTING ARTICLE

(71) Applicants: Tyco Electronics (Shanghai) Co., Ltd., Shanghai (CN); TE Connectivity Services GmbH, Schaffhausen (CH)

(72) Inventors: Lei (Alex) Zhou, Shanghai (CN); Qing (Carrie) Zhou, Shanghai (CN); Yun (Shanghai) Liu, Shanghai (CN); Huabin Du, Shanghai (CN); Mark Andrew Ondo, Middletown, PA (US); Sonny O Osunkwo, Middletown, PA (US); Lvhai (Samuel) Hu, Shanghai (CN); Dandan (Emily) Zhang, Shanghai (CN); Roberto Francisco-Yi Lu, Bellevue, WA (US)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 305 days.

(21) Appl. No.: 17/727,958

(22) Filed: Apr. 25, 2022

(65) Prior Publication Data
US 2022/0341852 A1 Oct. 27, 2022

(30) Foreign Application Priority Data
Apr. 25, 2021 (CN) .......................... 202110452742.8

(51) Int. Cl.
*G01N 21/88* (2006.01)

(52) U.S. Cl.
CPC . *G01N 21/8803* (2013.01); *G01N 2021/8854* (2013.01); *G01N 2021/8887* (2013.01)

(58) Field of Classification Search
CPC ....... G01N 21/8803; G01N 2021/8854; G01N 2021/8887; G01N 21/8806; G01N 2201/0221; G01N 21/8851; G01N 21/01; G01B 11/00; G01B 11/08; G01B 11/06;
(Continued)

(56) References Cited

U.S. PATENT DOCUMENTS

| 8,259,222 B2 * | 9/2012 | Rodriguez | H04N 23/56 |
| | | | 348/240.99 |
| 9,420,160 B2 * | 8/2016 | Yoshida | H04N 23/673 |
| 11,067,383 B2 * | 7/2021 | Liu | G01B 11/08 |

(Continued)

*Primary Examiner* — Isiaka O Akanbi
(74) *Attorney, Agent, or Firm* — Barley Snyder

(57) ABSTRACT

A portable visual inspection apparatus comprises a box including a lower box portion and an upper box portion. The upper box portion defines a first accommodation space and is connected to the lower box portion such that is capable of being opened and closed. A visual inspection device is installed in the first accommodation space and is adapted to be switched between an expanded configuration in which the visual inspection device is at least partially expanded for photographing an image of an article, and a folded configuration in which the visual inspection device is at least partially folded for storage in the first accommodation space. A support platform is arranged in the lower box portion and defines an inspection area below the visual inspection device in the expanded configuration. The portable visual inspection apparatus is switchable between a use configuration and a transportation configuration.

20 Claims, 6 Drawing Sheets

(58) Field of Classification Search
CPC .................... G01B 5/0004; G06T 7/50; G06T 2207/30164; G06T 7/62; G06T 7/68
USPC .................................. 356/237.1–237.6, 635
See application file for complete search history.

(56) References Cited

U.S. PATENT DOCUMENTS

| | | | |
|---|---|---|---|
| 11,761,882 B2* | 9/2023 | Yang | H01R 43/00 439/574 |
| 2009/0021654 A1* | 1/2009 | Jones | A45C 15/00 348/836 |
| 2012/0307026 A1* | 12/2012 | Rodriguez | G02B 25/005 348/63 |
| 2016/0021306 A1* | 1/2016 | Cho | H04N 23/80 348/135 |
| 2016/0093068 A1* | 3/2016 | Sugai | H04N 23/631 348/135 |
| 2016/0146594 A1* | 5/2016 | Nishio | G01B 21/047 348/135 |
| 2017/0178315 A1* | 6/2017 | Cho | G06T 7/60 |
| 2017/0285318 A1* | 10/2017 | Cho | G02B 21/025 |

* cited by examiner

PORTABLE VISUAL INSPECTION APPARATUS AND METHOD FOR INSPECTING ARTICLE

CROSS-REFERENCE TO RELATED APPLICATIONS

This application claims the benefit of Chinese Patent Application No. 202110452742.8 filed on Apr. 25, 2021 in the State Intellectual Property Office of China, the whole disclosure of which is incorporated herein by reference.

FIELD OF THE INVENTION

Embodiments of the present disclosure generally relate to performing a visual inspection of an article, and more specifically, to a portable visual inspection apparatus and an associated method of inspecting scattered products or components.

BACKGROUND

In the prior art, a visual inspection device is usually used to inspect the product or its components, for example, to check whether the product or its components have quality defects (for example, whether there are pits, notches, etc.) or whether the size of the product or its components is qualified. The existing visual inspection devices are large and relatively complex. Accordingly, they are not convenient for handling, and thus, cannot easily be moved, rearranged or transported.

Improved visual inspection devices are therefore desired which may be used to inspect products or components with greater flexibility, such as inspection devices which are easily transportable and configurable to inspect a variety of components in a variety of environments.

SUMMARY

According to an embodiment of the present disclosure, a portable visual inspection apparatus comprises a box including a lower box portion and an upper box portion. The upper box portion defines a first accommodation space and is connected to the lower box portion such that is capable of being opened and closed. A visual inspection device is installed in the first accommodation space and is switchable between an expanded configuration in which the visual inspection device is at least partially expanded for photographing an image of an article, and a folded configuration in which the visual inspection device is at least partially folded for storage in the first accommodation space.

A support platform is arranged in the lower box portion and defines an inspection area below the visual inspection device in the expanded configuration. The portable visual inspection apparatus is switchable between a use configuration and a transportation configuration. In the use configuration, the upper box portion is opened to expose the support platform and the visual inspection device is placed in the expanded configuration. In the transportation configuration the visual inspection device is placed in the folded configuration and the upper box portion is closed to form a complete box together with the lower box portion to close the visual inspection device and the support platform in a space defined by the upper box portion and the lower box portion.

BRIEF DESCRIPTION OF THE DRAWINGS

The invention will now be described by way of example with reference to the accompanying Figures, of which.

DETAILED DESCRIPTION OF THE EMBODIMENTS

Figure 1:
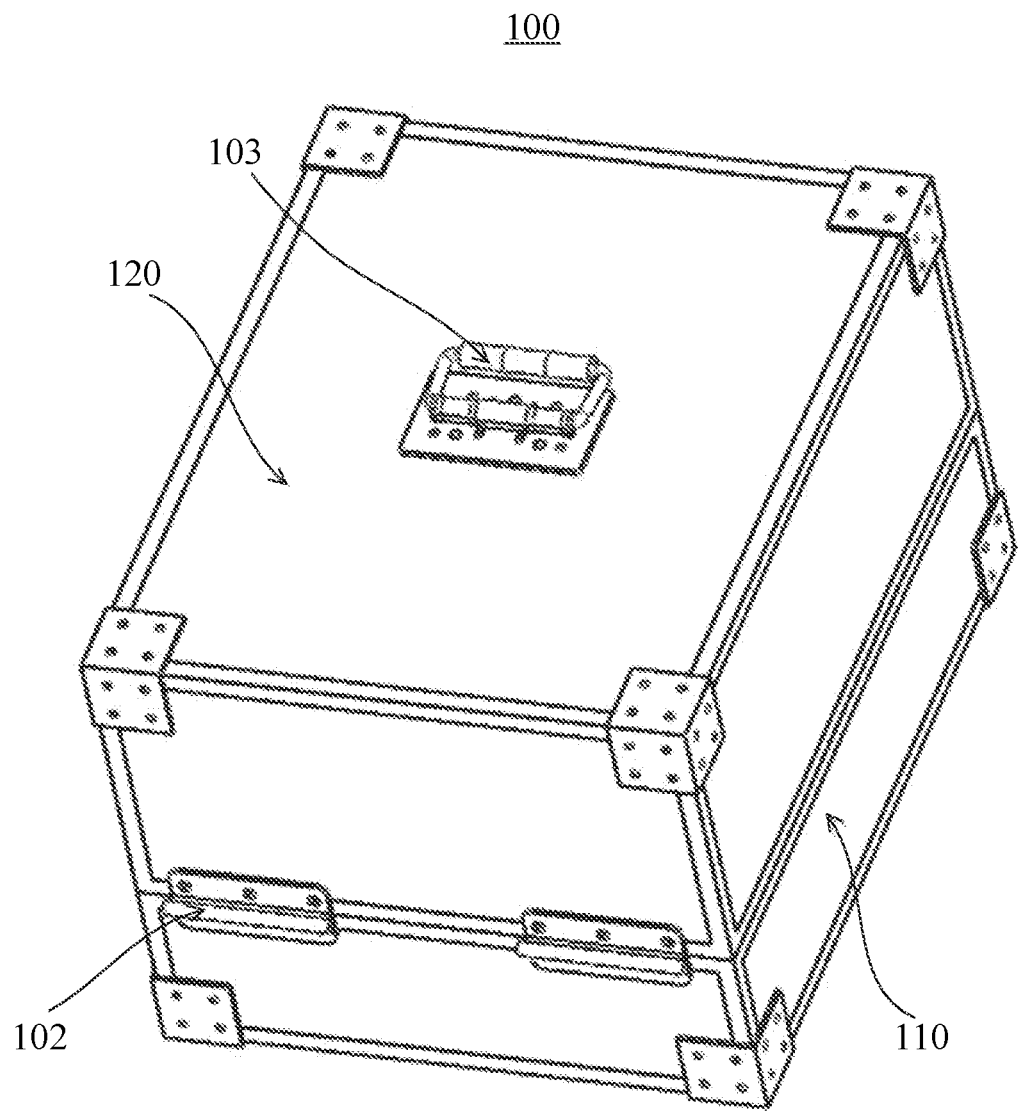
FIG. 1 is a rear perspective view schematically showing a portable visual inspection apparatus in a transportation configuration according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a portable visual inspection apparatus includes a box comprising a lower box (or box portion) and an upper box (or box portion), wherein the upper box is connected to the lower box in a way that is capable of being opened and closed, and the upper box defines a first accommodation space. A visual inspection device is installed in the first accommodation space and is switchable between an expanded configuration where the visual inspection device is at least partially expanded for photographing an image of an article and a folded configuration where the visual inspection device is at least partially folded for storage in the first accommodation space. A support platform is arranged in the lower box and defines an inspection area for placing the article to be inspected on it. The inspection area is located below the visual inspection device in the expanded configuration. The portable visual inspection apparatus is capable of being switched between a use configuration and a transportation configuration. When the portable visual inspection apparatus is in the use configuration, the upper box is opened to expose the support platform and the visual inspection device is switched to the expanded configuration. When the portable visual inspection apparatus is in the transportation configuration, the visual inspection device is switched to the folded configuration and the upper box is closed to form a complete box together with the lower box to close the visual inspection device and the support platform in a space defined by the upper box and the lower box.

As shown in FIGS. 1-4, according to an exemplary embodiment of the present disclosure, a portable visual inspection apparatus 100 is provided which is easy to carry to easily inspect articles on a variety of occasions, such as visual inspection of scattered product parts. The portable visual inspection apparatus 100 includes a box having a lower box 110 and an upper box 120, a visual inspection device 130 and a support platform 113 installed in the box.

The upper box 120 is connected to the lower box 110 in a manner that can be opened and closed, such as by means of a hinge 102, so that the portable visual inspection apparatus 100 can be switched between a use configuration and a transport configuration; In the use configuration, the upper box 120 is opened to expose the support platform 113, which is installed in the lower box 110 and defines an inspection area 114 for placing articles to be inspected thereon; In the transportation configuration, the upper box 120 is closed to form a complete box together with the lower box 110, such as a square box, so as to close the visual inspection device 130 and the support platform 113 in the internal space defined by the upper box 120 and the lower box 110, so as to facilitate carrying.

Figure 2:
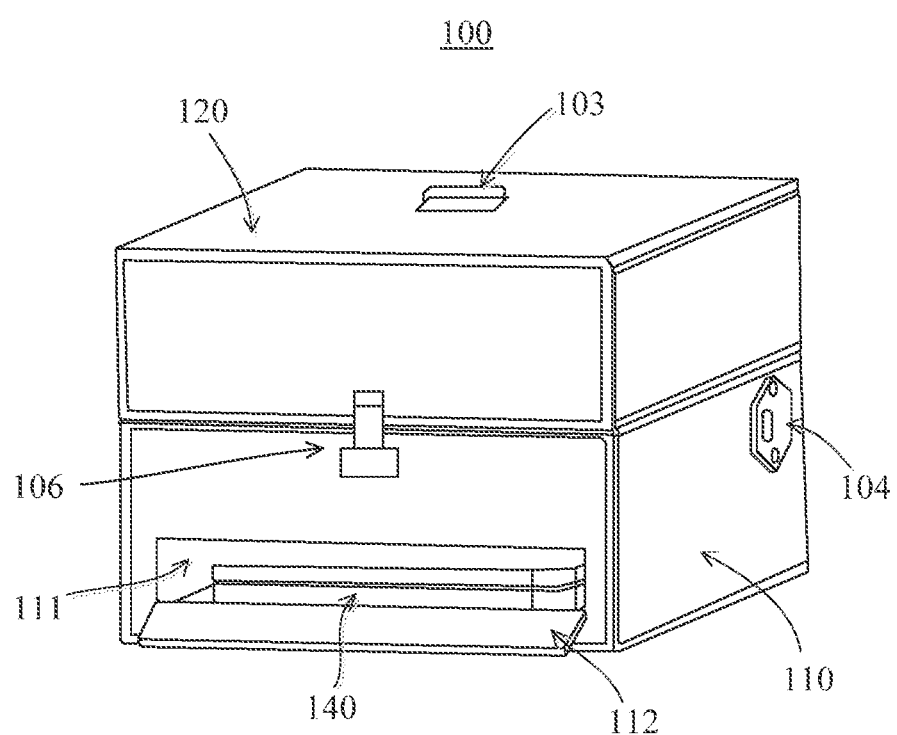
FIG. 2 is a front perspective view schematically showing a portable visual inspection apparatus in a transportation configuration according to an exemplary embodiment of the present disclosure.
Figure 3:
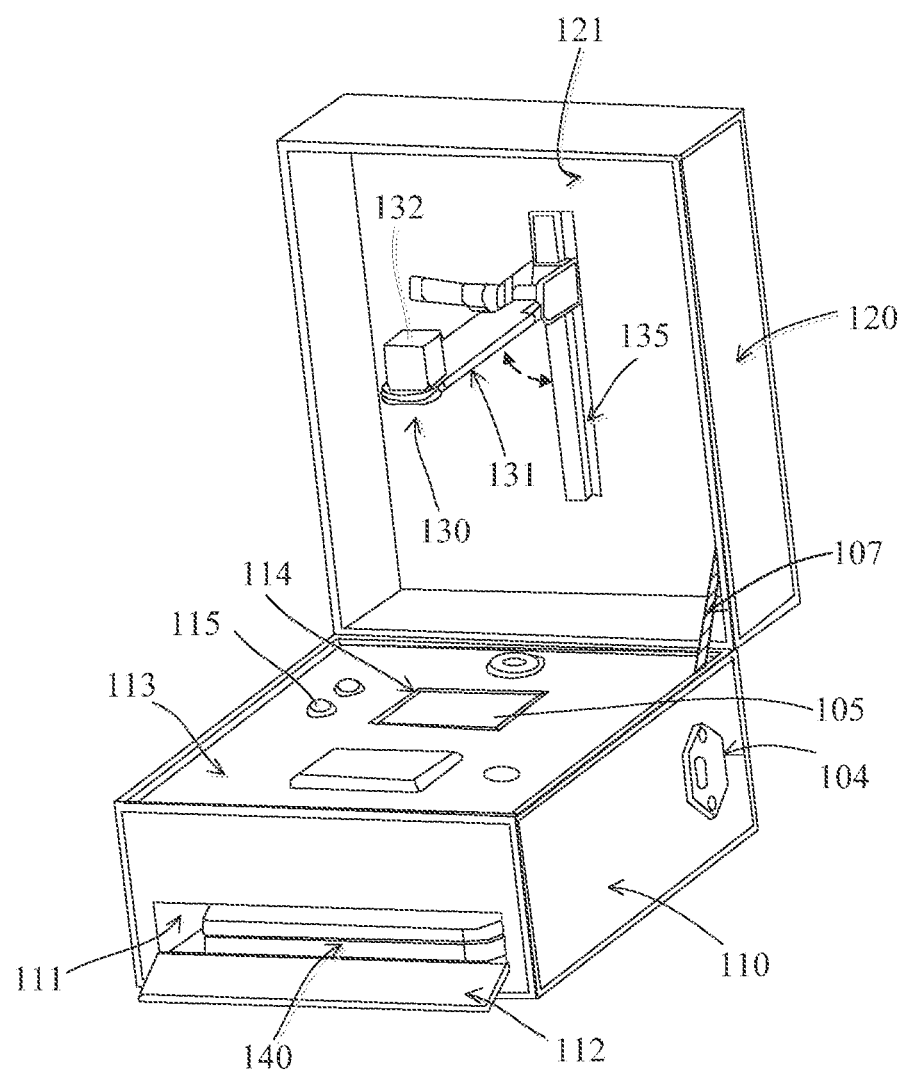
FIG. 3 is a perspective view schematically showing a portable visual inspection apparatus in a use configuration according to an exemplary embodiment of the present disclosure, in which a visual inspection device installed in an upper box and in an expanded configuration is shown.
Figure 4:
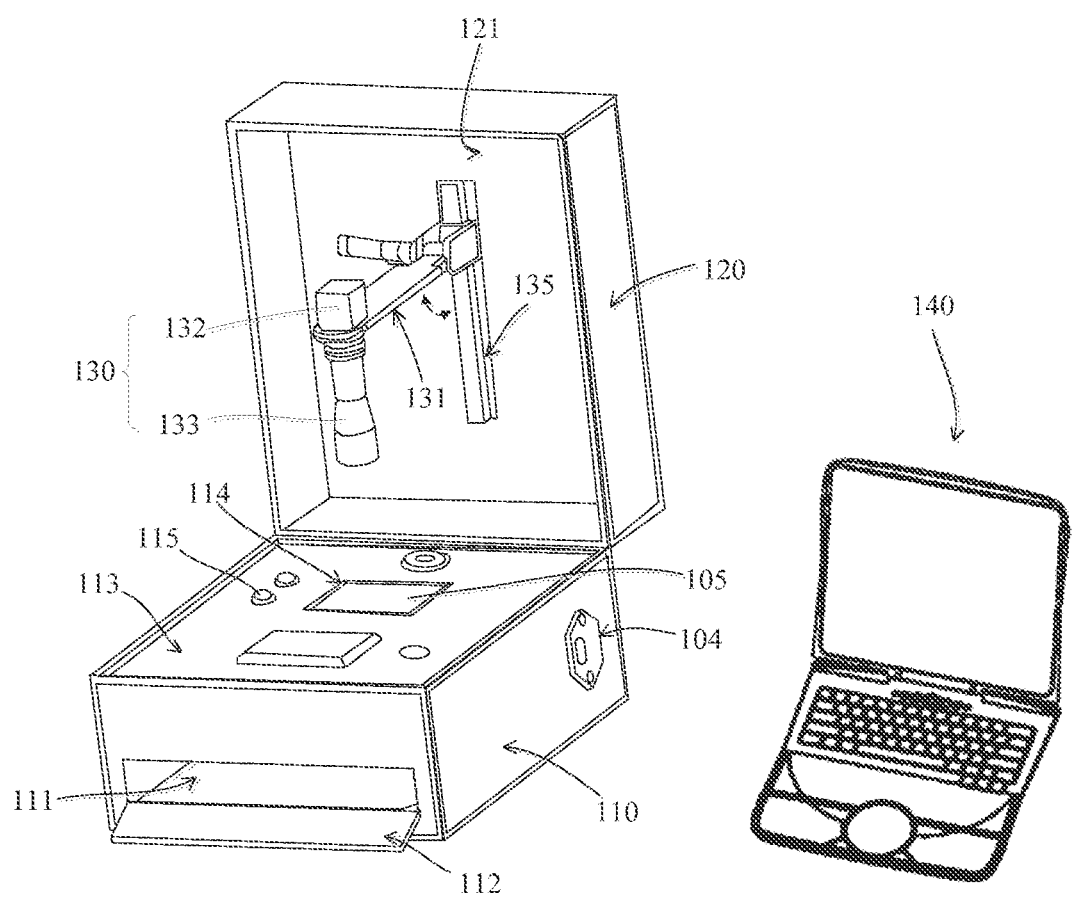
FIG. 4 is a perspective view schematically showing a portable visual inspection apparatus in a use configuration according to another exemplary embodiment of the present disclosure, in which a visual inspection device installed in an upper box and in an expanded configuration is shown.

FIGS. 1 and 2 show a portable visual inspection apparatus 100 in a transportation configuration or a non-use configuration, wherein the upper box 120 is closed, and FIGS. 3 and 4 show a portable visual inspection apparatus 100 in a use configuration, wherein the upper box 120 is opened.

The upper box 120 defines a first accommodation space 121, and the visual inspection device 130 is installed in the first accommodation space 121 and can be switched between the expanded configuration and the folded configuration. In the expanded configuration or expanded state, the visual inspection device 130 is at least partially expanded for photographing an image of an article placed on the support platform 113. In the folded configuration or folded state, the visual inspection device 130 is at least partially folded to be accommodated (e.g., fully accommodated) in the first accommodation space 121. For example, the overall thickness of the visual inspection device in the folded configuration is less than the depth of the first accommodation space, so that after closing the upper box, the visual inspection device contained therein will not touch the lower box or the support platform therein. By way of example, the upper box 120 is in the form of a box with a bottom opening, has a top wall and a circumferential side wall defining the first accommodation space 121, and the lower box 110 is in the form of a box with a top opening.

After the portable visual inspection apparatus 100 is switched to the use configuration, the visual inspection device 130 can be switched to the expanded configuration. At this time, the inspection area 114 of the support platform 113 is located below the visual inspection device 130 in the expanded configuration, so that the visual inspection device 130 can inspect the articles placed in the inspection area 114, such as obtaining the image of the articles. After the article inspection is completed, the visual inspection device 130 can be switched to the folding configuration so that the visual inspection device 130 is stored in the first accommodation space 121, the upper box 120 is closed and the upper box 120 is locked relative to the lower box 110 (e.g., by means of a latch 106), so that the portable visual inspection apparatus 100 can be switched to the transportation configuration for easy carrying or handling. For example, a portable handle 103 may be provided on the upper box 120.

In the use configuration, the upper box 120 can be opened to a suitable position or orientation relative to the lower box 110 so that the visual inspection device 130 can inspect the articles placed on the support platform 113. For example, the opened upper box 120 may be vertically positioned relative to the lower box 110, and the position or orientation of the opened upper box 120 relative to the lower box 110 may be supported or adjusted by the support rod 107.

In the illustrated embodiment, as shown in FIGS. 3 and 4, the visual inspection device 130 includes a foldable bracket 131 and a camera 132 installed on a first end (free end) of the foldable bracket, and a second end of the foldable bracket 131 opposite to the first end is installed on the inner wall of the upper box 120, so that the foldable bracket 131 can be switched between the expanded state and the folded state. In the expanded state, the foldable bracket 131 is expanded in a cantilever manner, such as away from the inner wall of the upper box 120, so that the camera 132 installed on its first end extends out of the first accommodation space 121 to be positioned directly above the inspection area 114. In this way, the visual inspection device 130 is switched to the expanded configuration. In the folded state, the foldable bracket 131 is folded, such as positioned close to the inner wall of the upper box 120, so that the camera 132 and the foldable bracket 131 are stored in the first accommodation space 121, in this way, the visual inspection device 130 is switched to the folded configuration.

The camera 132 may be mounted on the foldable bracket 131 in both the expanded state and the folded state. Alternatively, the camera 132 may be detachably mounted on the foldable bracket 131, only on the foldable bracket 131 in the deployed state, and may be removed from the foldable bracket 131 in the folded state. In the embodiment shown in FIG. 4, the visual inspection device 130 may also include a lens or lenses 133. After expanding the foldable bracket 131, the lens or lenses 133 may be installed on the foldable bracket 131 below the camera 132.

In the illustrated example, the second end of the foldable bracket 131 is pivotally mounted on the inner top wall of the upper box 120 so that the rest of the foldable bracket 131 (including the first end) and the camera 132 mounted on the foldable bracket 131 can be pivoted in a vertical and/or horizontal plane (as shown by the two-way dotted arrow in FIGS. 3 and 4) away from or close to the inner top wall of the upper box 120, to be switched between the expanded state and the folded state. In other examples, the second end of the foldable bracket may also be pivotally mounted to the inner side wall of the upper box in a similar manner to be able to be pivoted in a vertical plane and/or a horizontal plane, so that the foldable bracket can be switched between the expanded state and the folded state.

In an exemplary embodiment, the foldable bracket 131 is movably mounted on the inner wall of the upper box 120 so that the foldable bracket 131 can be moved in the horizontal and/or vertical directions, so that the distance and/or position of the camera 132 mounted on the foldable bracket 131 relative to the article placed on the inspection area 114 can be adjusted to facilitate focusing imaging.

In the embodiment shown in FIGS. 3 and 4, a slide rail 135 extending in the vertical direction is installed on the inner wall of the upper box 120, and the foldable bracket 131 is slidably installed on the slide rail 135 to adjust the distance and/or position of the camera 132 installed on the foldable bracket 131 relative to the article placed on the inspection area 114. Alternatively or additionally, a slide rail extending in the horizontal direction may also be arranged on the inner wall of the upper box, and the foldable bracket may be slidably installed on the slide rail to facilitate adjusting the position of the camera installed on the foldable bracket relative to the articles placed on the inspection area. In other embodiments, the slide rail arranged on the inner wall of the upper box can also extend obliquely relative to the horizontal or vertical direction, so that the distance and/or position of the camera installed on the foldable bracket relative to the article placed on the inspection area can be easily adjusted.

Still referring to FIGS. 3 and 4, the second end of the foldable bracket 131 can be pivotally mounted to the inner wall or slide rail 135 of the upper box 120 so that the foldable bracket 131 can be pivoted in a vertical plane or a horizontal plane to be switched between the expanded state and the folded state.

As shown in FIGS. 2-4, the portable visual inspection apparatus 100 may also include a data or image processor (and associated memory device(s)), such as a personal computer 140, which is adapted to be removably stored in the lower box 110 and configured to communicate with the visual inspection device 130 to acquire and process the image of the article acquired by the visual inspection device 130 for inspection of the article. For example, with this portable visual inspection apparatus, the article can be visually inspected based on the processing of the article image by the personal computer. The visual inspection includes, for example, at least one of defect detection, size detection, orientation detection and visual guidance of the article.

In the illustrated embodiment, the lower box 110 is provided with a second accommodation space 111, and the personal computer 140 is removably stored in the second accommodation space 111. As an example, the second accommodation space 111 may be located below the support platform 113, and an opening is formed on the side of the lower box 110, the personal computer 114 is suitable to be placed in the second accommodation space 111 (e.g., in a transportation configuration) or removed from the second accommodation space 111 (e.g., in a use configuration) through the opening. The lower box 110 may also be provided with a cover 112 configured to be closed in the transport configuration to cover the opening of the second accommodation space 111 and configured to be opened in the use configuration to allow the personal computer 140 to be removed from the second accommodation space 111.

The portable visual inspection apparatus also includes an electrical module, which can be arranged or hidden in the lower box 110 and located under the support platform 113. As an example, the electrical module may include a power supply, a digital I/O module, a USB hub, etc., and the visual inspection device or its camera and digital I/O module may be connected to the USB hub. In some examples, the lower box 110 or the upper box 120 may be provided with an electrical interface 104 through which a personal computer or an external device communicates or electrically connects with the visual inspection device 130 or an electrical module in a use configuration. The electrical interface may include a communication interface, such as a USB interface or an Ethernet interface. The camera and digital I/O module can be connected and communicated with the personal computer 140 through the USB interface, and the inspection of article can be controlled by the personal computer. In other examples, a personal computer may communicate wirelessly with the camera or the electrical device of the portable visual inspection apparatus.

As shown in FIGS. 3 and 4, the portable visual inspection apparatus 100 may be provided with an on/off button 115 for turning on or off the portable visual inspection apparatus 100 or the electrical module therein. In some examples, at the inspection area 114, such as below or on the side of the inspection area 114, a backlight 115 may be provided for illuminating the articles placed on the inspection area 114.

Figure 5:
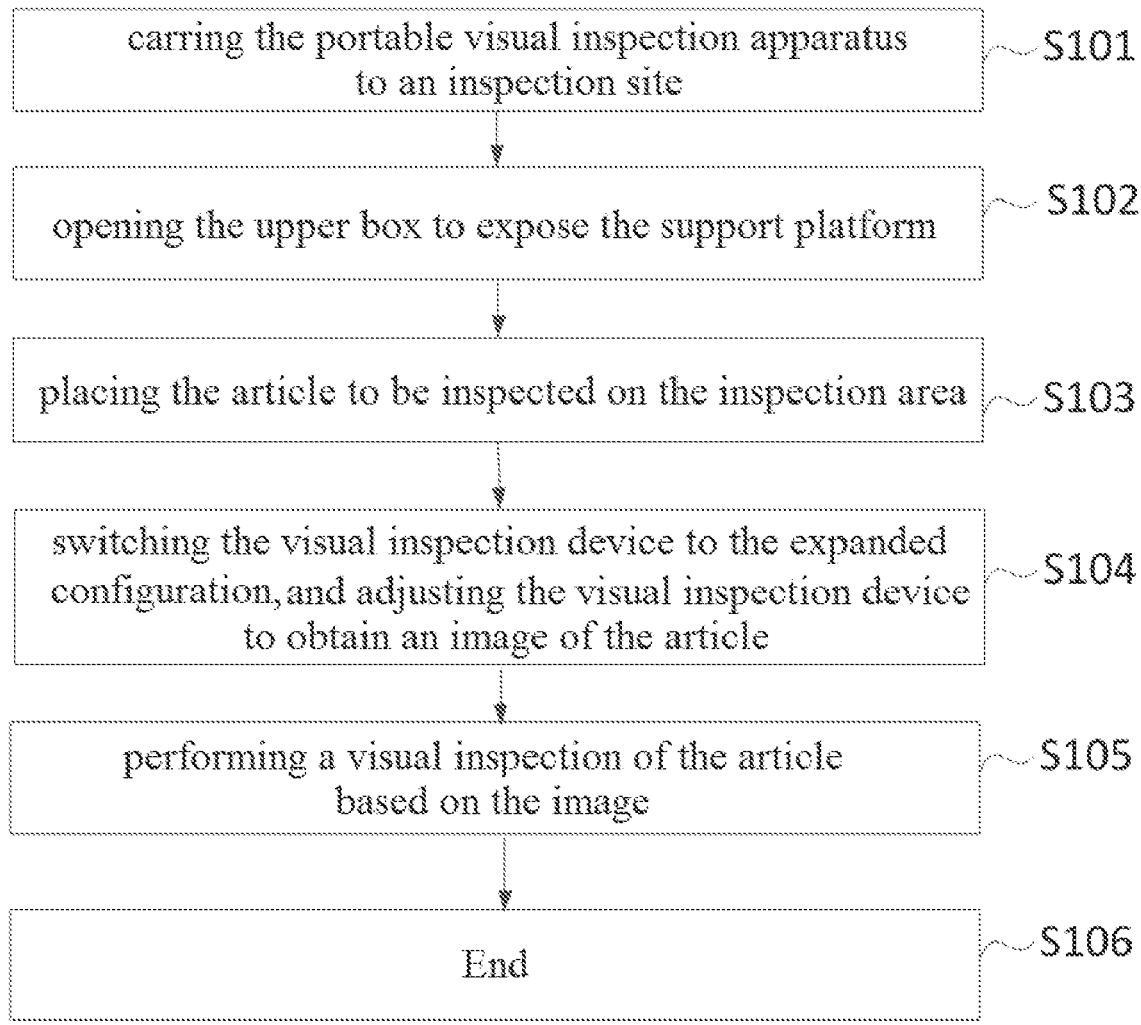
FIG. 5 is a flowchart schematically showing a method of visually inspecting an article using a portable visual inspection apparatus according to an exemplary embodiment of the present disclosure.

Embodiments of the present disclosure also include a method for inspecting an article using such the portable visual inspection apparatus, as shown in FIG. 5. The method primarily includes the steps of:

S101: carrying the portable visual inspection apparatus 100 to the inspection site;
S102: opening the upper box 120 to expose the support platform 113;
S103: placing the article to be inspected on the inspection area 114;
S104: switching the visual inspection device 130 to the expanded configuration, and adjusting the visual inspection device to obtain the image of the article; and
S105: performing visual inspection of the article based on the image, such as defect detection, size detection, orientation detection and/or visual guidance.

Therefore, the portable visual inspection apparatus described herein has the advantages of small volume, simple structure and easy to carry. It can be used as an independent inspection station to inspect articles on different occasions or without site restrictions, especially to inspect scattered parts. For example, with this portable visual inspection apparatus, its components can be inspected before or after the product is assembled. The salesperson can directly show the inspection function to customers or consumers. Users or developers can carry out product research and development in the laboratory, office, travel or even home, or carry out product sampling inspection on the production line. Various components of this portable visual inspection apparatus, such as lens or camera, can be flexibly installed and replaced, and can also be customized for different users or inspection needs.

Figure 6:
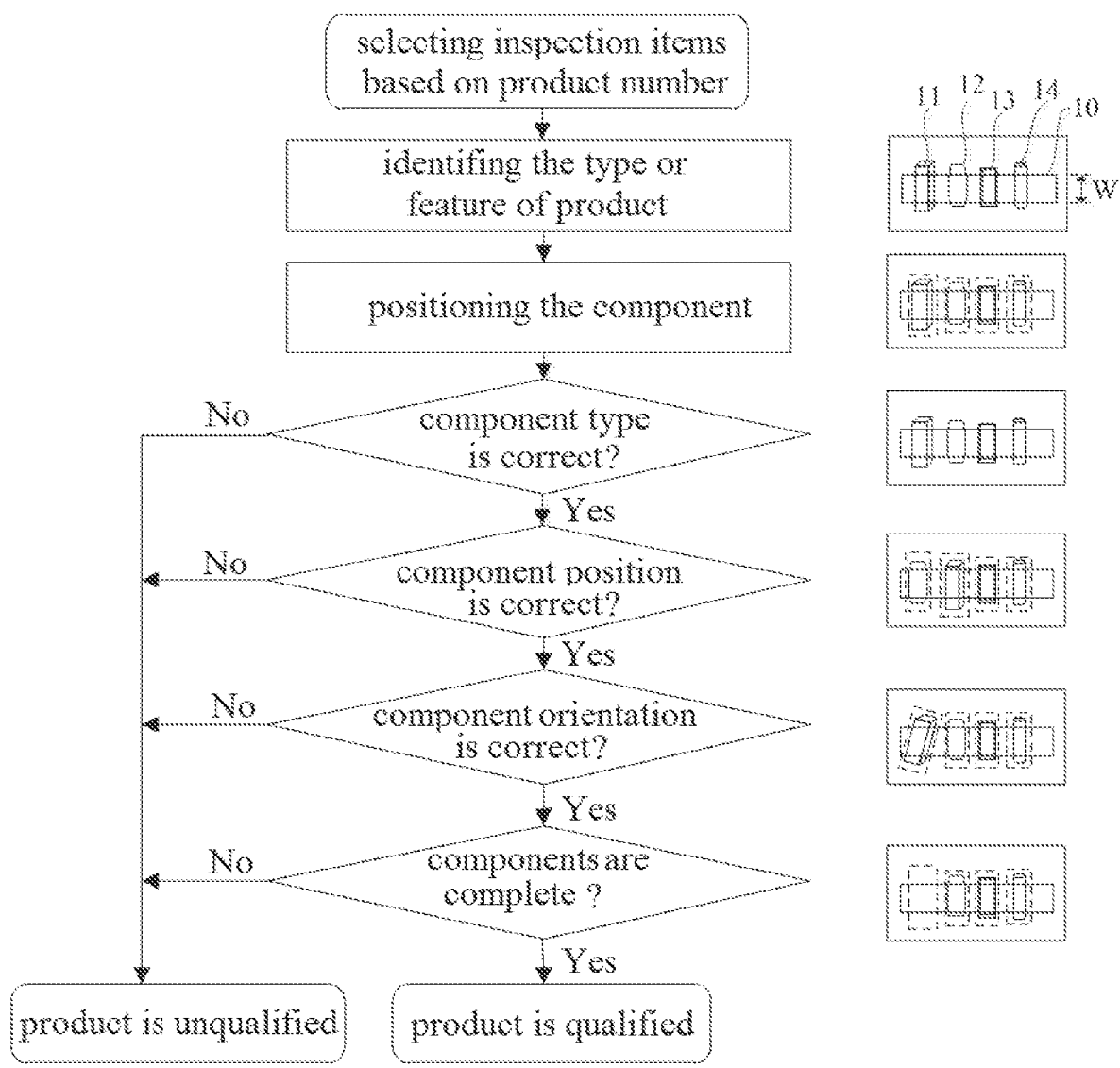
FIG. 6 is a flowchart schematically showing an example of a method of visual inspection of a product using a portable visual inspection apparatus according to an exemplary embodiment of the present disclosure.

Hereinafter, the inspection of one or more components of the product is described as an example. Such products may be, for example, cables or connectors. As shown in FIG. 6, after the images of the plurality of assembled components 11, 12, 13 and 14 of the product 10 (such as cable) are obtained by the camera, a visual inspection is performed in the personal computer based on the image, for example, an applicable inspection item or inspection program can be called and configured based on the product number. The visual inspection process may include:

identifying the type or feature of the product based on the image, such as the width W of the cable in the image, the size of each component, etc.;
positioning the components on the product in the image, that is, determining the position of each component in the image;
performing at least one of the following judgments:
determining whether the type of components on the product is correct, such as determining whether each component is a component required for assembling the product;
judging whether the position of the components on the product is correct, such as whether each component is located in a suitable position and placed in a correct order; For example, as shown in FIG. 6, the positions of components 11 and 12 are reversed;

determining whether the orientation of the components on the product is correct; For example, as shown in FIG. 6, the direction of the component 11 is inclined; and determining whether the components on the product are complete or not missing; For example, as shown in FIG. 6, the component 11 is missing;

determining that the product is qualified when the results of all the above judgments are Yes; and determining that the product is unqualified when the result of any of the above judgments is No.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A portable visual inspection apparatus, comprising:
a box comprising a lower box, and an upper box connected to the lower box and defining a first accommodation space, the upper and lower boxes are movably connected to one another between and open and closed position;
a visual inspection device installed in the first accommodation space and switchable between an expanded configuration in which the visual inspection device is at least partially expanded for photographing an image of an article and a folded configuration in which the visual inspection device is at least partially folded for storage in the first accommodation space; and
a support platform arranged in the lower box and defining an inspection area located below the visual inspection device in the expanded configuration, the portable visual inspection apparatus switchable between a use configuration and a transportation configuration, in the use configuration the upper box is opened to expose the support platform and the visual inspection device is placed in the expanded configuration, in the transportation configuration the visual inspection device is placed in the folded configuration and the upper box is closed to form a complete box together with the lower box to close the visual inspection device and the support platform in a space defined by the upper box and the lower box.

2. The portable visual inspection apparatus according to claim 1, wherein the visual inspection device includes a foldable bracket and a camera mounted on a first end of the foldable bracket, a second end of the foldable bracket opposite to the first end is installed on an inner wall of the upper box, such that the foldable bracket is movable between an expanded state and a folded state.

3. The portable visual inspection apparatus according to claim 2, wherein:
when the foldable bracket is in the expanded state, the foldable bracket extends away from the inner wall such that the camera installed on the first end extends out of the first accommodation space and into positioned directly above the inspection area; and
when the foldable bracket is in the folded state, the foldable bracket is folded in a position proximate to the inner wall such that the camera and the foldable bracket are stored in the first accommodation space.

4. The portable visual inspection apparatus according to claim 3, wherein the foldable bracket is movably mounted on the inner wall of the upper box and is movable in at least one of a horizontal direction or a vertical direction.

5. The portable visual inspection apparatus according to claim 4, wherein further comprising a slide rail mounted to the inner wall of the upper box and extending in at least one of the horizontal direction and the vertical direction, the foldable bracket slidably installed on the slide rail.

6. The portable visual inspection apparatus according to claim 5, wherein the second end of the foldable bracket is mounted to the inner wall or the slide rail such that the foldable bracket is pivotable in a vertical plane or a horizontal plane to be switched between the expanded state and the folded state.

7. The portable visual inspection apparatus according to claim 1, further comprising a personal computer removably stored in the lower box and communicating with the visual inspection device to acquire and process the image.

8. The portable visual inspection apparatus according to claim 7, wherein the portable visual inspection apparatus is adapted to perform a visual inspection of the article based on the processing of the image by the personal computer, the visual inspection including at least one of defect detection, size detection, orientation detection and visual guidance of the article.

9. The portable visual inspection apparatus according to claim 7, wherein the lower box is provided with a second accommodation space located below the support platform, and the personal computer is removably stored in the second accommodation space.

10. The portable visual inspection apparatus according to claim 9, wherein the second accommodation space is in communication with an opening through which the personal computer is adapted to be placed in or taken out of the second accommodation space.

11. The portable visual inspection apparatus according to claim 10, wherein the lower box includes a cover closable in the transport configuration to cover the opening and openable in the use configuration to allow the personal computer to be taken out of the second accommodation space.

12. The portable visual inspection apparatus according to claim 7, further comprising:

an electrical module arranged in the lower box and located below the support platform; and an electrical interface installed on the lower box or the upper box, when the portable visual inspection apparatus is in the use configuration, the personal computer or an external equipment communicates or electrically connects with the visual inspection device or the electrical module through the electrical interface.

13. A portable visual inspection apparatus, comprising:

a housing including a lower portion and an upper portion, the upper portion defining a first accommodation space and movably connected to the lower portion between an open position and a closed position being opened and closed;

a visual inspection device installed in the first accommodation space and movable between an expanded position for photographing an image of an article and a folded position wherein the visual inspection device is at least partially folded in the first accommodation space.

14. The portable visual inspection apparatus of claim 13, further comprising a support platform arranged in the lower box and defining an inspection area for placing the article to be inspected on it, the inspection area is located below the visual inspection device in the expanded position.

15. The portable visual inspection apparatus of claim 14, wherein the portable visual inspection apparatus is switchable between a use configuration and a transportation configuration, in the use configuration, the upper box is opened to expose the support platform and the visual inspection device is switched to the expanded configuration.

16. The portable visual inspection apparatus of claim 15, wherein when the portable visual inspection apparatus is in the transportation configuration, the visual inspection device is switched to the folded position and the upper box is closed to form a complete box together with the lower box to close the visual inspection device and the support platform in a space defined by the upper box and the lower box.

17. The portable visual inspection apparatus of claim 14, wherein in the expanded position, the visual inspection device extends out of the first accommodation space and into positioned directly above the inspection area.

18. A method for inspecting an article by using the portable visual inspection apparatus comprising steps of:

carrying the portable visual inspection apparatus to an inspection site;

opening an upper housing to expose a support platform;

placing the article to be inspected on an inspection area of the support platform;

extending a visual inspection device from the upper housing;

adjusting the visual inspection device to obtain an image of the article; and performing a visual inspection of the article based on the image.

19. The method according to claim 18, wherein the visual inspection includes at least one of defect detection, size detection, orientation detection and visual guidance of the article.

20. The method according to claim 18, wherein the article is a product including one or more components, and performing a visual inspection of the article based on the image comprises steps of:

identifying a type or feature of the product based on the image;

positioning the component on the product in the image;

performing at least one of the following judgments of:

determining whether the type of component on the product is correct;

determining whether the position of component on the product is correct;

determining whether the orientation of component on the product is correct; and determining whether the components on the product are complete or not missing; and determining that the product is qualified when the results of all the above judgments are Yes, and determining that the product is unqualified when the result of any of the above judgments is No.

\* \* \* \* \*